No. 764,580. PATENTED JULY 12, 1904.
J. M. GRAVES.
METHOD OF JOINING SECTIONS OF UNDERGROUND CONDUITS FOR ELECTRIC CABLES.
APPLICATION FILED JUNE 20, 1903.
NO MODEL.
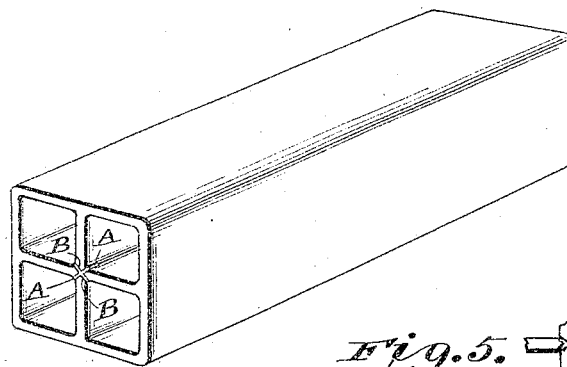
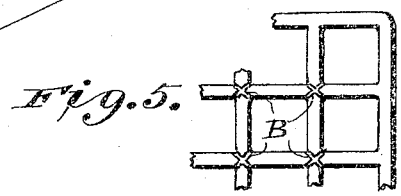
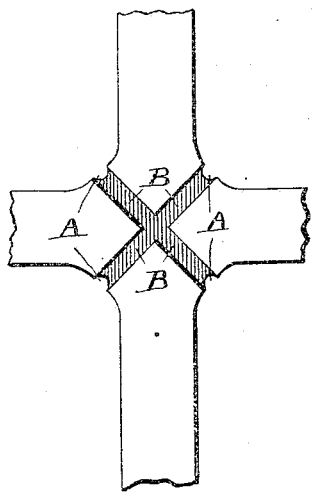
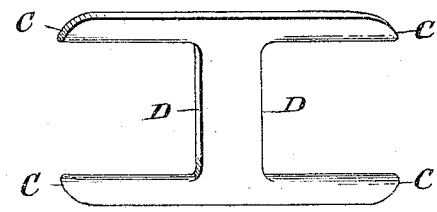
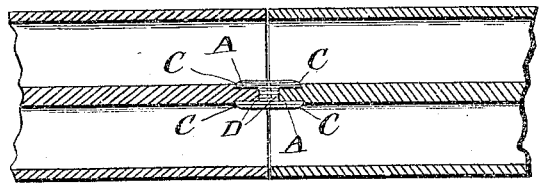

No. 764,580.

Patented July 12, 1904.

UNITED STATES PATENT OFFICE.

JAMES M. GRAVES, OF BRAZIL, INDIANA.

METHOD OF JOINING SECTIONS OF UNDERGROUND CONDUITS FOR ELECTRIC CABLES.

SPECIFICATION forming part of Letters Patent No. 764,580, dated July 12, 1904.

Application filed June 20, 1903. Serial No. 162,382. (No model.)

*To all whom it may concern:*

Be it known that I, JAMES M. GRAVES, a citizen of the United States, residing at Brazil, in the county of Clay and State of Indiana, have invented certain new and useful Improvements in Methods of Joining Sections of Underground Conduits for Electric Cables; and I do hereby declare the following to be a full, clear, and exact description of the invention, such as will enable others skilled in the art to which it appertains to make and use the same.

This invention relates to underground conduits for electric cables or the like, known as "multiple-duct conduits," in which more than one duct are combined in one section, these sections to be laid in the ground with ends abutting, fastened one to the other, and sealed, making a series of continuous ducts in which may be installed a cable or cables for the transmission of electricity.

My invention has for its objects an improvement in the means of joining the abutting ends and securing an alinement of the ducts as well as a close fitting of the sections, so that when joined there will be no space between the abutting ends and the sections will be held securely square with one another.

While my invention is susceptible of various changes in the form, properties, and minor details of construction without departing from the principle or sacrificing any of the advantages thereof, still the preferred embodiment is illustrated in the accompanying drawings, in which—

Figure 1 is a perspective view. Fig. 2 is an endwise view of a section of a conduit-section, showing method of attaching the improved joint-clamp. Fig. 3 is a view of the improved joint-tenon. Fig. 4 is a sectional view of the clamp when joining two sections of conduit, and Fig. 5 is an end view showing how the number of ducts may be multiplied and the manner of applying my invention thereto.

Referring to the drawings, Fig. 1 shows a conduit-section, made of clay, in rectangular form containing four ducts; but I do not limit myself to the four-duct conduit as shown, as my invention can be equally well used with any multiple-duct conduit, the description hereinafter following applying thereto as well as to the four-duct conduit. As shown more particularly by Fig. 2, in each inner portion of the several ducts, on both ends of the conduit, is formed a short groove or depression A, which recedes longitudinally from the end of the conduit-section, preferably a distance of about one inch. Crossing each other and meeting exactly with the grooves or depressions A, I provide two lateral grooves or depressions in the ends of the sections at the cross-web, as shown by Fig. 2 at B. These grooves or depressions above described may be formed in the ends of the conduit-section by means of a die or any other well-known method which will cause them to be accurate, and thus cause the ducts of the sections to perfectly aline when my improved tenon (shown in Fig. 3) is inserted as shown in Fig. 4.

By reference to Fig. 3 it will be seen that I provide the conduit-tenon of such shape and dimensions that it will slip snugly into the grooves or depressions, as provided in Fig. 2—that is, I provide a body portion D, having, preferably, four prongs C projecting therefrom, two on each side, and forming altogether a substantially H-shaped tenon, the inner ends of opposite prongs meeting at similar points on the opposite sides of the body portion and being formed, preferably, with tapering ends and rounded on the inside and flat on the outside in cross-section for the purpose above noted. Two of the prongs C will pass into the grooves or depressions A, while half of the body of the clamp D will pass into the grooves or depressions B. The portion of the tenon, Fig. 3, projecting from the section thus described will enter the abutting section in the same manner, permitting the abutting sections to fit perfectly together and be securely held in alinement. I provide these grooves or depressions in series, so that the conduit-section no matter how placed in the trench will fit one to the other without turning or adjusting. The grooves or depressions are to be made deep enough so that the clamp will have a firm hold in the sections. The improved clamp should preferably be made of metal and may be stamped out of sheet metal, its thickness being sufficient to fit the grooves or depressions snugly.

My improved conduit-joint tenon and method of joining precludes all possibility of a weakening effect in the conduit-section by the use of dowel-holes and dowel-pins either internal or external. The center cross-web of a conduit-section may be made lighter, and thus reduce the weight without diminishing the strength of the section.

Obviously my invention may be used in widely varying forms, and some features thereof may be modified or used without others.

Therefore, without limiting myself to the preferred construction shown and described nor enumerating equivalents, I claim, and desire to obtain by Letters Patent, the following:

1. A multiple-duct conduit for electric cables provided with longitudinal grooves or depressions in the core formed by the meeting webs or partitions of the multiple duct, said grooves or depressions meeting with another groove or depression formed in the end of the core, substantially as described.

2. A multiple-duct conduit for electric cables provided with a plurality of longitudinal grooves or depressions formed in the inner portions of the ducts and meeting with a plurality of other grooves or depressions formed laterally across the end of the web, substantially as described.

3. A multiple-duct conduit for electric cables provided at each end with a plurality of short longitudinal grooves or depressions formed in the inner portions of the ducts and meeting with a plurality of other grooves or depressions formed laterally across the ends of the web, substantially as described.

4. As an article of manufacture, a tenon for uniting the meeting ends of conduit-sections for electric cables, comprising a body portion and a plurality of parallel prongs on each side thereof the prongs on one side of the body portion being symmetrical in relation to those on the other side, substantially as described.

5. As an article of manufacture, a tenon for uniting the meeting ends of conduit-sections for electric cables, comprising a body portion and a plurality of prongs on each side thereof semi-elliptical in cross-section, substantially as described.

6. As an article of manufacture, a substantially H-shaped tenon for uniting the meeting ends of conduit-sections for electric cables, substantially as described.

7. A multiple-duct conduit for electric cables formed of a plurality of sections, each section provided with longitudinal grooves or depressions in the inner portions of two of the ducts and meeting with another groove or depression formed in the end of the web, in combination with a tenon provided with prongs fitting in said grooves or depressions whereby said sections are united, substantially as described.

8. A multiple-duct conduit for electric cables formed of a plurality of sections, each section provided with a plurality of longitudinal grooves or depressions formed in the inner portions of the ducts and meeting with a plurality of other grooves or depressions formed laterally across the ends of the web, in combination with a tenon provided with prongs fitting in said grooves or depressions whereby said conduit-sections are united, substantially as described.

9. A plurality of conduit-sections having longitudinal and lateral grooves or depressions in their ends, in combination with a substantially H-shaped tenon fitting in said grooves or depressions whereby said sections are united, substantially as described.

In testimony whereof I affix my signature in presence of two witnesses.

JAMES M. GRAVES.

Witnesses:
 BLANCHE WATTS,
 ANNA LANAGAN.